US008538912B2

(12) United States Patent
Simitsis et al.

(10) Patent No.: US 8,538,912 B2
(45) Date of Patent: Sep. 17, 2013

(54) APPARATUS AND METHOD FOR AN AUTOMATIC INFORMATION INTEGRATION FLOW OPTIMIZER

(75) Inventors: Alkiviadis Simitsis, Santa Clara, CA (US); William K. Wilkinson, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 380 days.

(21) Appl. No.: 12/888,128

(22) Filed: Sep. 22, 2010

(65) Prior Publication Data

US 2012/0072391 A1    Mar. 22, 2012

(51) Int. Cl.
*G06F 17/30*    (2006.01)

(52) U.S. Cl.
USPC .......................................... 707/602

(58) Field of Classification Search
USPC .......................................... 707/602
See application file for complete search history.

(56) References Cited

U.S. PATENT DOCUMENTS

| 6,208,990 | B1 | 3/2001 | Suresh et al. | |
| 7,512,614 | B2 | 3/2009 | Yao | |
| 8,160,999 | B2 * | 4/2012 | Jin et al. | 707/602 |
| 8,219,518 | B2 * | 7/2012 | Jin et al. | 707/602 |
| 2008/0195430 | A1 | 8/2008 | Rustagi | |
| 2012/0095957 | A1 * | 4/2012 | Reddy et al. | 707/602 |

OTHER PUBLICATIONS

Abhinandan Das et al., "Approximate Join Processing Over Data Streams," Proc. ACM SIGMOD 2003, Jun. 9-12, 2003, San Diego CA.
Goetz Graefe, "Query Evaluation Techniques for Large Databases," ACM Computing Surveys, vol. 25, No. 2, Jun. 1993.
N. Polyzotis et al., "Supporting Streaming Updates in an Active Data Warehouse," Proc., IEEE ICDE, 2007.
Alkis Simitsis et al., "QoX-Driven ETL Design: Reducing the Cost of ETL Consulting Engagements," Proc. SIGMOD 2009, Jun. 29, 2009, Providence, Rhode Island.
Yufei Tao et al., "RPJ: Producing Fast Join Results on Streams through Rate-Based Optimization" Proc. ACM SIGMOD 2005, Jun. 14-16, 2005, Baltimore, Maryland.
Tolga Urhan et al., "XJoin: A Reactively-Scheduled Pipelined Join Operator," IEEE Computer Society Technical Committee on Dta Engineering, 2000.
Stratis D. Viglas et al., "Maximizing the Output Rate of Multi-Way Join Queries over Streaming Information Sources," Proc. of the $29^{th}$ VLDB Conference, Berlin, Germany, 2003.

* cited by examiner

*Primary Examiner* — Baoquoc N To

(57) ABSTRACT

An apparatus and method provides automatic information integration flow optimization. The apparatus may include an input/output port connecting the information integration flow optimizer to extract-transform-load tools. The information integration flow optimizer includes a parser unit to create a tool-agnostic input file containing rich semantics, a converter to transform the tool-agnostic input file into an input DAG, and a QoX-driven optimizer applying one or more heuristic algorithms to the input DAG to develop an optimum information integration flow design based on the rich semantics. The method may include receiving a tool-specific input file representing a physical information integration flow, parsing and converting the tool-specific input file into an input DAG containing tool-agnostic rich semantics, and applying heuristic algorithms to the input DAG to develop an optimum information integration flow design based on the rich semantics.

20 Claims, 5 Drawing Sheets

APPARATUS AND METHOD FOR AN AUTOMATIC INFORMATION INTEGRATION FLOW OPTIMIZER

FIELD OF THE INVENTION

The present invention relates to optimizing information integration flows and, in particular, to an apparatus and method for an automatic information integration flow optimizer.

BACKGROUND

Enterprises and organizations may have information located in many different and diversely located databases. These databases may be memory areas within the same data store, or may be resident on various data store units. For example, a manufacturing enterprise may have customer contact information in a sales department database, accounting database information (e.g., invoicing, accounts receivable, payment, credit, etc.) may be in another database, manufacturing department information (e.g., bill of parts, vendor, assembly instructions, etc.) may be in yet another database. Or, several departments may have customer information in each database, but the information may be listed differently for each database (by name, by account number, by phone number, or first name last, last name first, etc.). An information integration system may process the information in the various databases with a flow to gather information in these databases and relocate the information to a common repository referred to as a data warehouse.

An information integration flow may be a series of instructions that may be responsible for extracting data from data sources, transforming the data, and finally, populating the data to a central data warehouse. Conventional ETL (extract, transform, load) tools may implement their own design and representation methods for capturing the semantics (e.g., relationships between the various data elements) and the functionality of information integration flows.

These ETL tools may use a graphical user interface to represent these flows. For example, information integration flows may be represented by a directed acyclic graph (DAG). A DAG is a graphic-based representation that may model several different kinds of structure in, for instance, computer science. The DAG may represent a set of sequence of data flow and control as edges (lines). Data may enter a node, which may represent a processing element or step (e.g., transformations, operations, steps, tasks, activities), through its incoming edges and leaves the vertex through its outgoing edges. Design constructs may be used to automatically create executable scripts for running the ETL process from the DAG.

As information integration flows become more complex, and business managers seek stricter time-related requirements (e.g., small execution windows, longer uptime, increasing freshness, more fault-tolerant flows, etc.), optimizing information integration flows may become more important. Currently information integration flow optimization is typically done manually. Some ETL tools provide some primitive optimization mechanisms, but these conventional tools cannot optimize a large-scale, real-world information integration flow as a whole.

Research results suggest optimization techniques at different design levels. Information integration flows may be optimized during two phases: during flow design and during flow execution. Example optimization techniques may include flow rewriting and restructuring, partitioning, use of recovery points, redundancy, scheduling, choice among alternative implementations for the same task, changes in resource allocation, etc.

Conventional information integration projects may be designed for correct functionality, and adequate performance, i.e., to complete within a specified time window. However, optimization of the information integration flow design is a task left to the experience and intuition of the natural person designers of the information integration flow.

DETAILED DESCRIPTION

Figure 1:
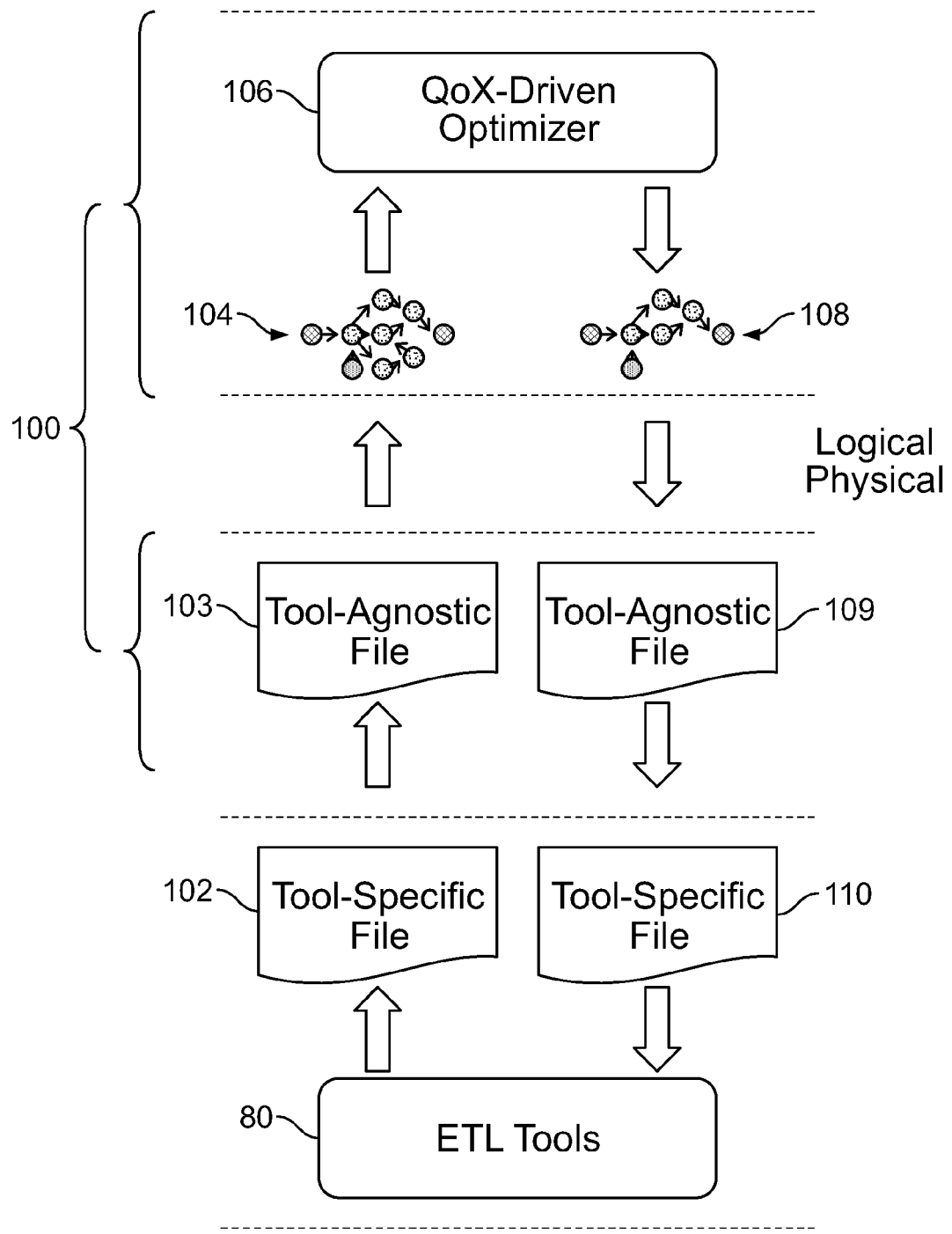
FIG. 1 schematically depicts an information integration flow optimizer in accordance with an embodiment of the invention.

An automatic information integration flow optimizer in accordance with an embodiment of the invention may perform optimization at the design and execution levels of an information integration flow by sharing information between the two levels. Accurate and effective information integration flow execution may be achieved by obtaining insight into the flow through real-time, automatic monitoring (at predefined intervals or continuously) of execution parameters and statistics (for example, selectivity, throughput, resources' utilization, uptime, etc.), of the whole flow, of parts of the flow, and/or of individual operators contained in the flow.

Careful design to optimize an information integration flow at the execution level may be needed because information integration flows may be more complex than the typical relational queries that are handled by a database optimizer (a module of a database management system responsible for optimizing database queries). Portions of the information integration flow may be best executed outside the database engine, for example, inside the ETL engine, or the file system (e.g., datasets that may be stored in ordinary files outside the database engine and outside the ETL engine). For such files, data may be directly manipulated in the files rather than loading the files into the database or ETL engine and manipulating the files there. Other portions of the information integration flow might need to run inside the database engine itself. An information integration flow optimizer in accordance with an embodiment of the invention may operate at the information integration flow design level to automatically identify the ETL tool (e.g., on the ETL engine, data source engine, and/or data warehouse engine) where to best run portions of an information integration flow.

An information integration flow optimizer in accordance with an embodiment of the invention may select among various execution scenarios and various processing choices, for instance: running the information integration flow in streaming or batch mode, selecting among information integration flow styles (ETL style vs. extract-load-transform (ELT) style vs. extract-transform-load-transform (ETLT) style vs. other variants), adjusting the number of machines to be used, parallelization techniques, partitioning policies, etc. By way of example, parallelization techniques may include pipeline, partitioning parallelism, etc., and partitioning policies may include hash-based, round-robin, range, etc.

Information integration flow styles may have different execution modes based on business requirements and/or design decisions, so that flow styles other than ETL may be chosen. Other styles may include: (a) Extract-Load-Transform (ELT), where data may be first loaded to the data warehouse and then transformation and cleansing operations may be applied; and (b) Extract-Transform-Load-Transform (ETLT), where, after the extraction, several lightweight transformations (e.g., large data reduction operations) may be applied, then the data may be loaded to the data warehouse machine, and then more heavy operations may take place.

Monitoring of execution parameters and statistics (e.g., selectivity, throughput, resources' utilization, uptime, etc.) of the whole flow or portions or individual flow operators may provide the flow execution insight for accurate and effective optimization.

In one embodiment in accordance with the invention, an optimization technique may work seamlessly at both the design and execution levels by sharing information between these two levels. Such dynamic and cooperative optimization may be driven by the internal, functional characteristics and properties of the information integration flow. Knowledge obtained by monitoring the information integration flow may provide semantics for both the flow and its operators.

An information integration flow optimizer in accordance with an embodiment of the invention may consider separate metadata and properties for different information integration flows objects like operator, dataset, schema, implementation, and also the database engine. Being able to consider different information integration flow operators separately may allow the information integration flow optimizer to operate independently of specific physical configurations, ETL engines, data source engines, and/or database engines.

FIG. 1 schematically depicts information integration flow optimizer unit 100 in accordance with an embodiment of the invention. Information integration flow optimizer unit 100 may work on top of ETL tools 80 (e.g., an ETL engine, a data source engine, and/or a data warehouse engine) and the physical layer. The physical layer is the execution code of the information integration flow (e.g., information integration, data source, and/or data warehouse code) and the logical layer is the design layer where the information integration flow design is developed. An information integration flow optimizer unit in accordance with an embodiment of the invention may be driven by various quality objectives (QoX). A non-exhaustive list of QoX metrics that can be used to guide optimization include: performance, recoverability, reliability, freshness, maintainability, scalability, availability, flexibility, robustness, affordability, consistency, traceability, and auditability.

A logical information integration design (or the metadata and other structural properties) of a physical flow may be provided to information integration flow optimizer unit 100 in the form of tool-specific input file 102. The tool-specific input file may be an extensible markup language (XML) file, a flat file (e.g., delimited, fixed-width, etc.), an ETL flow stored in a database repository, etc. Tool-specific input file 102 itself may be provided by the information integration flow designer as a tool-specific representation. The physical flow represented by the tool-specific input file may be an existing flow, or a proposed flow to be optimized. Information integration flow optimizer unit 100 may parse tool-specific input file 102 into tool-agnostic input file 103 that may be enriched with information regarding properties (described below) of datasets, implementations, schema, operators, database management systems, and/or ETL tools. A tool-agnostic enriched input file may allow the information integration flow optimizer to arrive at a more optimal flow based on the attributes, functionality, and capabilities provided by the properties. Information integration flow optimizer unit 100 may parse tool-agnostic input file 103 and transform the parsed results into input directed acyclic graph (DAG) 104, which may be a graphical representation of the information integration workflow described by tool-specific input file 102 as enriched with the added properties provided in tool-agnostic input file 103.

Input DAG 104 may have vertices that may represent an operation and/or a data store, and edges that may represent flow between the vertices. The input DAG may be analyzed by QoX-driven optimizer unit 106 using one or more heuristic algorithms to produce an optimized information integration workflow based on design properties (e.g., metadata) and physical properties (e.g., statistics). Because input DAG 104 may be a representation of enriched tool-agnostic input file 103, QoX-driven optimizer unit 106 may be able to produce a more optimized flow strategy when compared to a flow strategy based only on the tool-specific representation of tool-specific input file 102. Additionally, the property-enriched information of tool-agnostic input file 103 may allow the QoX-driven optimizer unit to achieve optimization of multiple goals as opposed to a single-goal optimization obtainable from tool-specific information. QoX-driven optimizer unit 106 may designate which of ETL tools 80 perform portions of the optimized flow based on the enriched properties provided by tool-agnostic input file 103 to achieve the multiple goals in a distributed manner.

The optimized information integration flow design produced by QoX-driven optimizer unit 106 may be represented as output DAG 108. With reference to FIG. 1, comparing output DAG 108 to input DAG 106 shows that the output DAG has fewer vertices and edges, which results in a more streamlined information integration flow.

Output DAG 108, representing the optimized information integration flow design, may be transformed by information integration flow optimizer unit 100 into tool-agnostic output file 109, which may be a physical flow (i.e., execution code). As determined by QoX-driven optimizer unit 106, one or more portions of the content of tool-agnostic output file 109 representing the optimized physical information integration flow may be executed inside an ETL engine, a data warehouse engine, and/or a data store engine. Tool-agnostic output file 109 may include the data that designates which ETL tools execute respective portions of the optimized information integration flow design. Tool-agnostic output file 109 may than be converted to tool-specific output file 110.

Information integration flow optimizer unit 100 may be agnostic to a specific ETL tool engine. For example, information integration flow optimizer unit 100 may support input and export to both commercial and/or open-source ETL tools, for example PowerCenter (Informatica Corp., Redwood City, Calif.), Oracle Warehouse Builder (OWB) (Oracle Corp., Redwood Shores, Calif.), and Kettle or Pentaho Data Integration (PDI) (Pentaho Corp., San Francisco, Calif.).

In one embodiment in accordance with the invention, information integration flow optimizer unit 100 may enable designers of the initial information integration flow to develop and express the initial design using techniques convenient to the designers themselves. For example, if the designers feel that certain types of flows may be easier to read and maintain (e.g., multiple short information integration flows rather than one long complicated information integration flow), they may do so without incurring a performance penalty in the optimized information integration flow design produced by information integration flow optimizer unit 100. The information integration flow optimizer may obtain multiple input files, each representing the short information integration flow design, and produce an optimized information integration flow design that may include the objectives of each short information integration flow.

Figure 2:
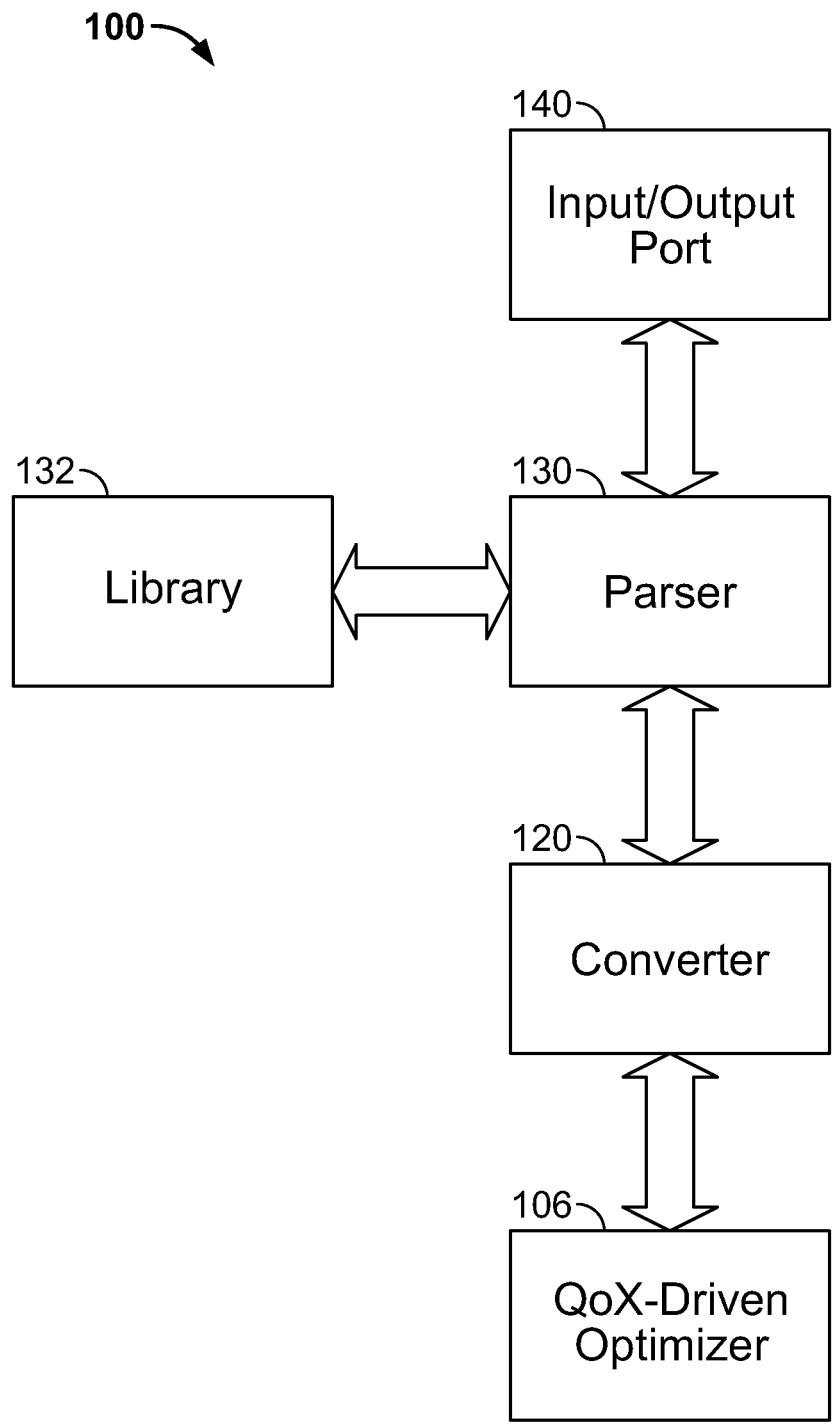
FIG. 2 schematically depicts a block diagram of the embodiment of FIG. 1.

FIG. 2 schematically depicts a block diagram of information integration flow optimizer unit 100 in accordance with an embodiment of the invention. Information integration flow optimizer unit 100 may include input/output (I/O) port 140. The I/O port may connect information integration flow optimizer unit 100 to the ETL tools. I/O port 140 may receive tool-specific input file 102 and may transmit output file 110 to and from information integration flow optimizer unit 100. In one embodiment in accordance with the invention, the external portion of I/O port 140 may be coupled to an electronic communication network (e.g., the Internet, a local area network, a wireless local area network, etc.). In another embodiment in accordance with the invention, the external portion of I/O port 140 may be coupled to an enterprise computer system in which one or more of the ETL tools may be resident.

The I/O port may provide parser unit 130 with tool-specific input file 102. Parser unit 130 may parse the input file and transform the data within tool-specific input file 102 into tool-agnostic input file 103. Parser unit 130 may access library 132 to obtain the information regarding the properties (e.g., attributes, functionality, capabilities, etc.) of the datasets, implementations, schema, operators, database management systems, and/or ETL tools. Tool-agnostic input file 103 may be converted to input DAG 104, which may have similar, albeit enriched, semantics as the tool-specific input file data. In one embodiment of parser unit 130, the transformation of the parsed results may be done by converter unit 120, which may be separate from parser unit 130. The transformation of the parsed results may convert the tool-agnostic input file data into a DAG format that may be supported by QoX-driven optimizer unit 106.

QoX-driven optimizer unit 106 may use one or more heuristic algorithms that may be driven by the internal functional characteristics and properties of the information integration flow design represented by input DAG 104 based on the data from tool-specific input file 102, including metadata structural properties and statistical data. The heuristic algorithms applied by QoX-driven optimizer unit 106 may develop an optimal information integration flow design by using a heuristic search over the space of possible information integration flow designs that meet the design objectives represented within the tool-specific input file, or files. The heuristic search may be guided by forecasting the metrics of the above-identified, and other, quality objectives for each proposed information integration flow design and selecting an optimized information integration flow design based on evaluating the metrics. The evaluation of the metrics may include a tradeoff between metrics based on design and/or business objectives.

QoX-driven optimizer unit 106 may identify dependencies and relationships among the metrics that can be used to evaluate the tradeoffs in optimizations of flows. For example, a design may sacrifice performance for maintainability. Alternatively, in some cases, techniques for improving performance (e.g., partitioning and parallelization) may increase freshness, but on the other hand may hurt maintainability and robustness. An inherent difficulty is that different metrics may come into play at different levels of the methodology. For example, freshness and reliability can be evaluated at the physical level, while their implication at the logical level may not be as readily evaluated.

Maintainability and robustness can drive conceptual and logical modeling. Scalability and performance may span the conceptual, logical, and physical levels. Another dimension of metrics may be that some reflect characteristics of the data, such as freshness, consistency, traceability, while other metrics may be characteristic of just the workflow, such as maintainability, recoverability, and robustness.

QoX-driven optimizer unit 106 may implement a systematic approach to compare and trade off between the different metrics. For example, to incorporate the semantics that each metric has into a common design space, consider two classes of metrics: the qualitative and the quantitative. The former class may contain "higher level" QoX metrics that can be seen as soft goals, e.g., "The information integration process should be reliable." The latter class may contain "lower level" metrics that may be functional parameters of the system; e.g., time window, execution time, recoverability time, arrival time, number of failures, latency of data updates, memory, space, CPU utilization uptime, throughput, number of processors, and so on. The QoX-driven optimizer unit may use a modeling approach that may correlate the QoX metrics and enable comparison among them.

For example, the notion of "reliable" can be expressed as: "the mean time between failures (MTBF) should be greater than x time units". Another example could be, "the uptime should be more than y time units." Thus, using this logic, QoX-driven optimizer unit 106 may associate reliability with availability. Going from higher to lower, more detailed, design levels, these associations become more concrete and are represented by objective functions that can be more readily evaluated for tradeoffs in determining an optimal information integration flow.

After arriving at an optimized information integration flow design, QoX-driven optimizer unit 106 provides output DAG 108 which may then be transformed and parsed by converter unit 120 and parser unit 130 into tool-agnostic output file 109 and then tool-specific output file 110 provided to I/O port 140. The I/O port then may provide the tool-specific output file 110 to the ETL tools, where portions, or the entire, of the tool-specific output information flow may be readable by a different ETL engine/tool than the one that produced the tool-specific input file so that the optimized information integration flow may be performed on the ETL tools of the tool-specific output information flow is as determined by QoX-driven optimizer unit 106 to achieve multiple optimization goals in a distributed manner.

Figure 3:
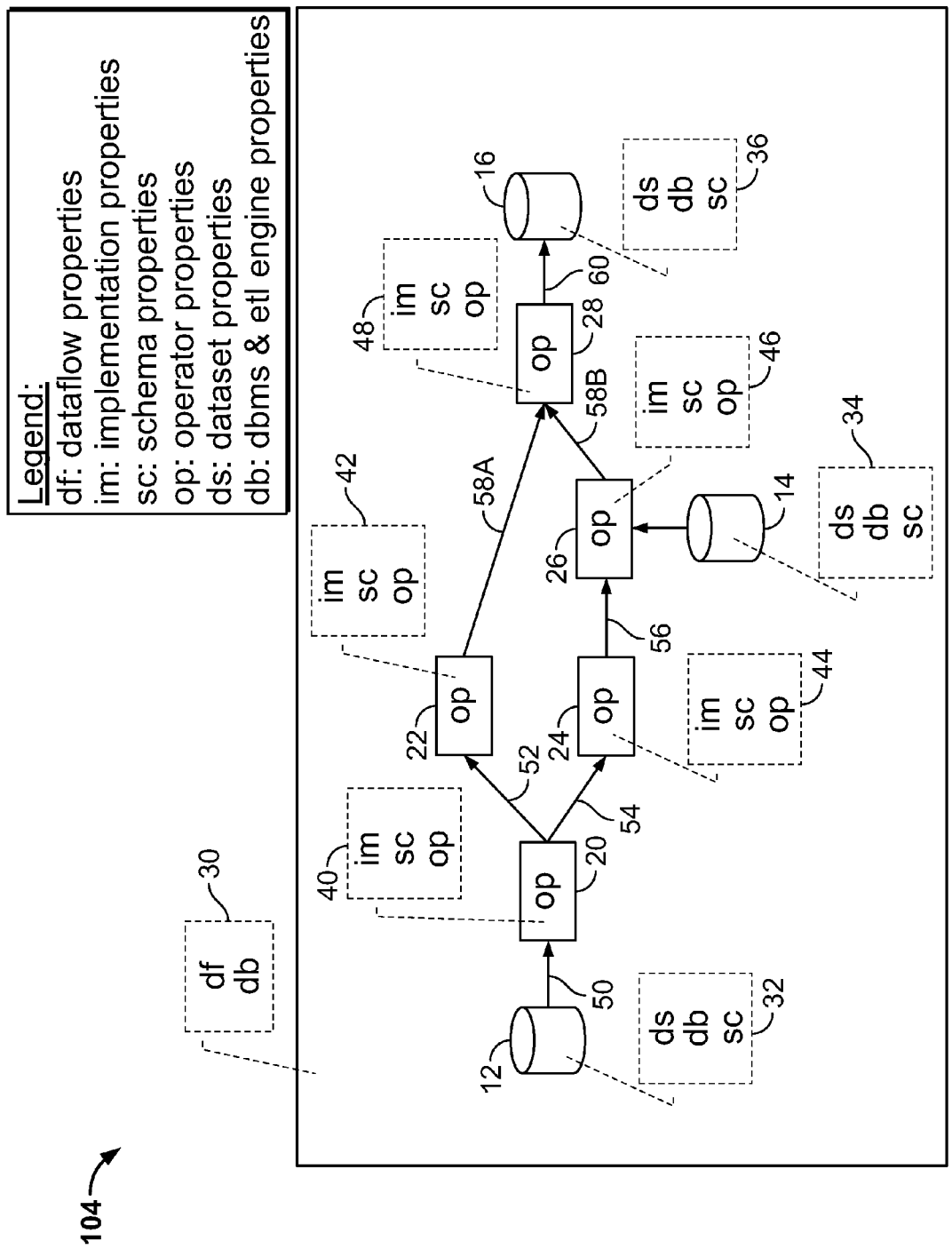
FIG. 3 schematically depicts a directed acyclic graph in accordance with an embodiment of the invention.

In accordance with an embodiment of the invention, FIG. 3 schematically depicts an example of input DAG 104. Input DAG 104 may include one or more data source(s) (e.g., input dataset(s) 12, 14) and data sink(s) (e.g., output dataset 16). Each dataset may be annotated by its own finite set of properties 32, 34, 36, which may include dataset properties (ds), DBMS and ETL engine properties (db), and schema properties (sc) that are properties of columns within a dataset.

Input DAG 104 may include one or more operators (op) 20-28. In general, an operator may transform a number of inputs to a number of outputs, possibly adding or removing data. Each operator of the Input DAG may be annotated with a finite set of properties 40-48, which may include implementation properties (im) of an operator (e.g., a filtering operation could be performed using a C subroutine, a Java program, using a database, etc.), schema properties (sc), and operator properties (op). Edges 50-60 represent the flow of datasets between operators and/or data sources/sinks. The dataset(s) represented by each edge may also include dataset properties (ds). Input DAG 104 may be annotated by specific flow properties 60, which may include dataflow properties (df) and DBMS and ETL engine properties (db).

As noted above, QoX-driven optimizer unit 106 may apply heuristic algorithms to input DAG 104 to arrive at output DAG 104. To perform the optimization, information integration flow optimizer unit 100 may receive a rich description via tool-agnostic input file 103 so that the vertexes and edges of the input DAG may be fully described. QoX-driven optimizer unit 106 may access a library of possible transformations that it can perform on the input DAG (e.g., reorder two nodes, change an operator type to another operator type, etc.), and a library of possible implementations of each operator that includes a rich semantic description of each.

The following sections describe properties of the information integration design flow that may be represented within tool-specific input file 102 and provided to information integration flow optimizer unit 100 by the ETL tool(s). The use of these properties by QoX-driven optimizer unit 106 for information integration flow optimization are also described below.

Information Integration Flow Properties

As mentioned above, an operator may transform a number of inputs to a number of outputs (see Table I; Property: category, inputs, outputs), possibly adding or removing data (see Table I; Property: selectivity). An operator may have any number of implementations. An implementation may be in any number of programming languages, and may even be implemented in a database management system (DBMS) (see Table IV; Property: canPushDown). An implementation also may have some associated cost functions (see Table IV; Property: costExec, where Expression refers to some user-provided function). An operator may have a number of parameters (see Table I; Property: parameterSchema). A dataset may have a schema and may exist as a stream, an event stream, on a file and/or as a database table (see Table II; Type).

Although not shown in Tables I-V, each property may have an additional Boolean attribute, hidden, that when true hides the property from the design level. Hidden properties may be used for optimization only and so may not need to be exposed to designers of the information integration flows.

Operator Properties

For optimizing operators, the information integration flow optimizer unit is provided with specific properties that describe the operator's functionality. For example, assuming that in a flow there are two subsequent operators $O_1$ and $O_2$, if operator $O_2$ is very selective and operator $O_1$ is not, then it may be tempting to move $O_2$ before $O_1$ to optimize the flow. But QoX-driven optimizer unit 106 may examine whether the two operators $O_1$ and $O_2$ may be swapped based on their properties provided by the tool-specific input file. If $O_2$ acts on a specific part of the data (e.g., a function over a field called "salary") and $O_1$ affects that part of the data (e.g., a currency converter that converts dollars to Euros), then QoX-driven optimizer unit 106 would determine not to perform this rearrangement. Therefore, properties like selectivity and the parameter schema are of interest. Table I lists representative properties for some operators.

TABLE I

| Property | Type | Description |
| --- | --- | --- |
| Name | String | Operator name |
| Category | "row", "router", "grouper", "splitter", "holistic", "binary", "n-ary" | Category of operator |
| Inputs | Dataset | A set of input streams |
| outputs | Dataset | A set of output streams |
| parameterSchema | Schema | Parameters to the operator |
| implementations | Implementation | A set of implementations |

TABLE I-continued

| Property | Type | Description |
| --- | --- | --- |
| selectivity | Positive real | The ratio of the primary output stream cardinality to the primary input stream cardinality |
| orderPreserving | Boolean | True if operator preserves order |
| isBlocking | Boolean | True if operator processes all input before producing any output |
| cardinalityPreserving | Boolean | True if operator does no filtering |
| isParallelizable | Boolean | True if a parallelizable implementation exists |
| IsPartitionable | Boolean | True if a partitioning implementation exists |
| hasSQLImpl | Boolean | True if the operator has an SQL implementation |
| Phase | "extract", "transform", "load" | The ETL phase where the operator is used |
| hasContextParam | Boolean | True if the operator has a context parameter |
| hasPassThruParam | Boolean | True if the operator has a pass-through parameter |

Dataset Properties

Apart from knowledge on the operators, information about the specific execution instance may need to be known. Execution instance information may be strongly related to the nature of the dataset that will be processed by the information integration flow. For example, depending on the type of the dataset—e.g., whether it is coming as a stream, or is an event stream, or resides on a table or a file—QoX-driven optimizer unit 106 may choose among different implementations for specific algorithms. For example, a merge-sort or a nested-loop join for static data, a rate-based progressive join (RPJ), multi-way or xJoin implementation for joining streaming data or even approximate join if high freshness is required, a meshjoin for streaming and static data, etc. Similar decisions may be taken for other objectives, like fault-tolerance; e.g., using recovery points for static data and redundancy for streaming data. Table II lists representative properties for some datasets.

TABLE II

| Property | Type | Description |
| --- | --- | --- |
| Name | String | Stream name |
| schema | Schema | Schema of the stream |
| Type | "stream", "eventStream", "file", "DBMS" | The type of the dataset. |
| isTable | DBMS or null | If not null, specifies the DBMS holding the table |
| isPrimary | Boolean | Specifies if the dataset is the primary input to a multi-input operator, e.g., in a join, one input is the main data stream and the other data stream is secondary. Similarly for multi-output operators. |
| cardinality | Integer | Expected number of rows |
| TupleLength | Integer | Average tuple length |

Schema Properties

Properties of interest regarding the schema contain type and null. For example, based on these, QoX-driven optimizer unit 106 can decide how to partition a dataset. The QoX-driven optimizer unit may consider simple tuples of atomic data types, and more complex structured types, semi-structured data, etc. Table III lists representative properties for some schema.

TABLE III

| Property | Type | Description |
| --- | --- | --- |
| Name | String | Name of column |
| Type | "String", "Boolean", "Integer", "Real", "Context", "PassThru", . . . | Type of data |
| Null | Boolean | True if can be null |
| default | Any atomic type | Default value if null |

Implementation Properties

Properties describing implementation details for the flow may be useful for optimizing it at both the design and execution levels. For example, based on information about the execution or overhead costs, the QoX optimizer unit may decide how to rewrite the flow (e.g., changing the placement of operators). Memory requirements can be used to make decisions regarding partitioning, for fault-tolerance (e.g., save at the disk vs. running redundant flows), and others. If a certain implementation of a certain operator has a blocking nature, then this operator might not be included in a group of operators that may be parallelized. If an operator has alternative implementations—e.g., blocking, parallelizable, single threaded, etc.—the QoX-driven optimizer may choose the most appropriate based on the dataset being processed.

For example, a single threaded version might be more maintainable and more fault-tolerant than one running on multiple machines. The former version might be preferable also for large sized datasets, since the cost of using the parallelizable version (e.g., for merging back the results—if needed) can become quite considerable. The implementation language used for coding an operator and its ability to be pushed down in the database engine can be a helpful property for use by QoX-driven optimizer unit 106 to decide where and how to execute the operator (e.g., inside the data store, the ETL, or the data warehouse engine). Table IV lists representative properties s for some implementations.

TABLE IV

| Property | Type | Description |
| --- | --- | --- |
| Name | String | Name of implementation |
| Type | "parallelizable", "partitionable", "singleThread" | Specifies if the implementation runs as a single thread or if it can be parallelized or if it can run partitioned |
| isEventStreamOp | Boolean | True if operator handles event streams |
| language | "C", "Java", "Shell", "SQL" | Implementation language |
| canPushDown | DBMS or null | If not null, specifies the DBMS that can execute the operator |
| Flow | "row", "holistic", . . . | |
| isBlocking | Boolean | True for blocking operator, else pipeline is assumed |
| costExec | Expression | Execution cost |
| costOvhd | Expression | Overhead cost (initialization, termination, etc.) |
| memory | Expression | Memory requirements |

DBMS and ETL Engine Properties

The optimized information integration flow may be processed by one or more of ETL tools 80 where each tool executes part, or all, of the flow. QoX-driven optimizer unit 106 may determine which ETL tool(s) may execute which part of the flow. Such a determination may be in part based on the properties in Table V.

Because information integration flow optimizer unit 100 receives the initial, non-optimized information integration flow, and provides the optimized information integration flow design, the tool-specific input file may provide information about the ETL tools themselves. This information may be used by QoX-driven optimizer unit 106 to exploit characteristics of each engine in determining where each portion of the optimized information integration flow design may execute. For example, the QoX-driven optimizer unit may need to know whether an engine can support only specific types of partitioning or whether the engine supports any special optimization techniques. Table V lists representative properties for some DBMS and ETL engines.

TABLE V

| Property | Type | Description |
| --- | --- | --- |
| Name | String | Name of database |
| Type | "PostgreSQL", "Oracle", "SeaQuest", . . . | Type of database |
| connectString | String | Connect string |

Figure 4A:
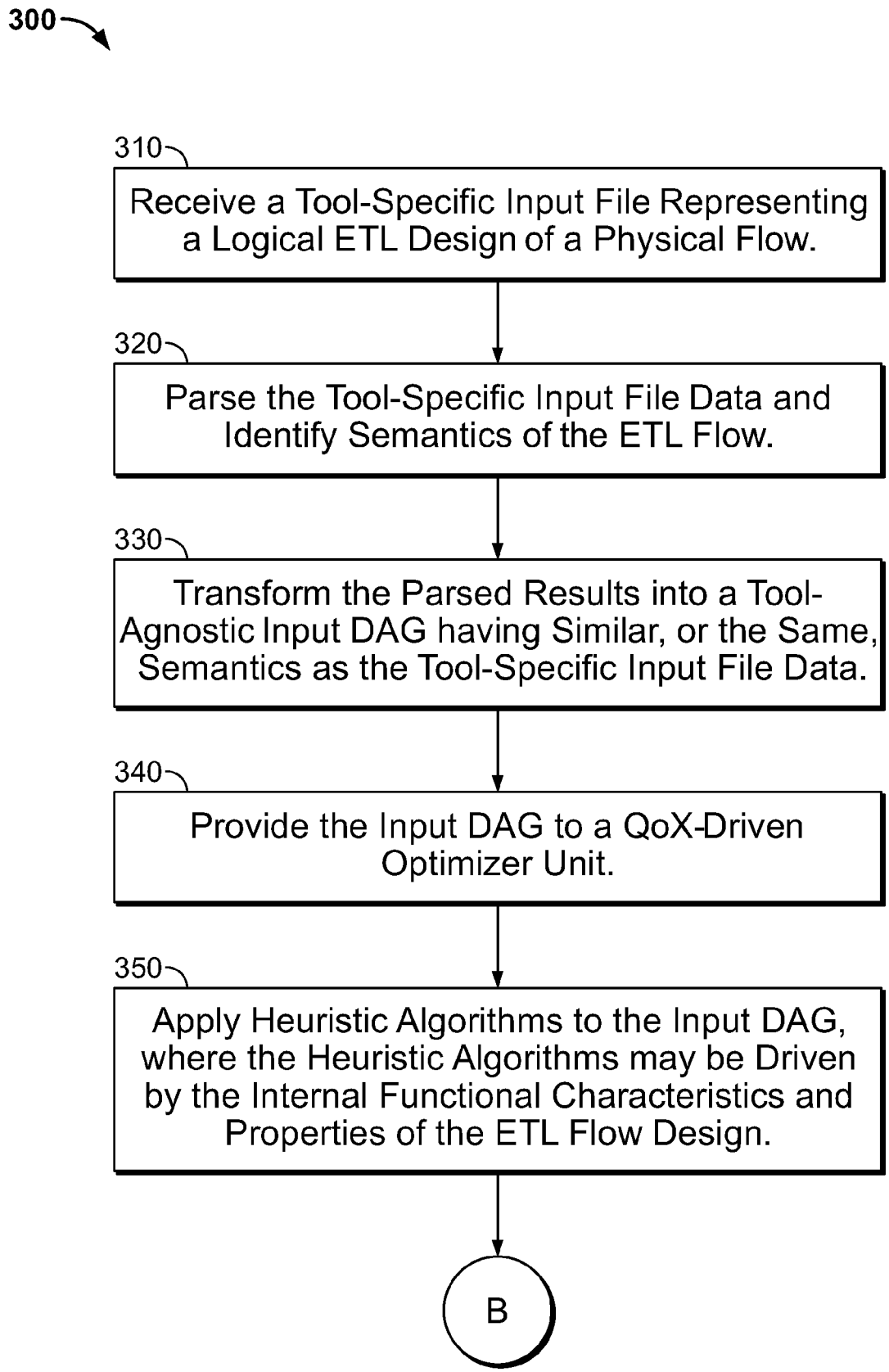
FIGS. 4A-4B schematically depict a process in accordance with an embodiment of the invention.
Figure 4B:
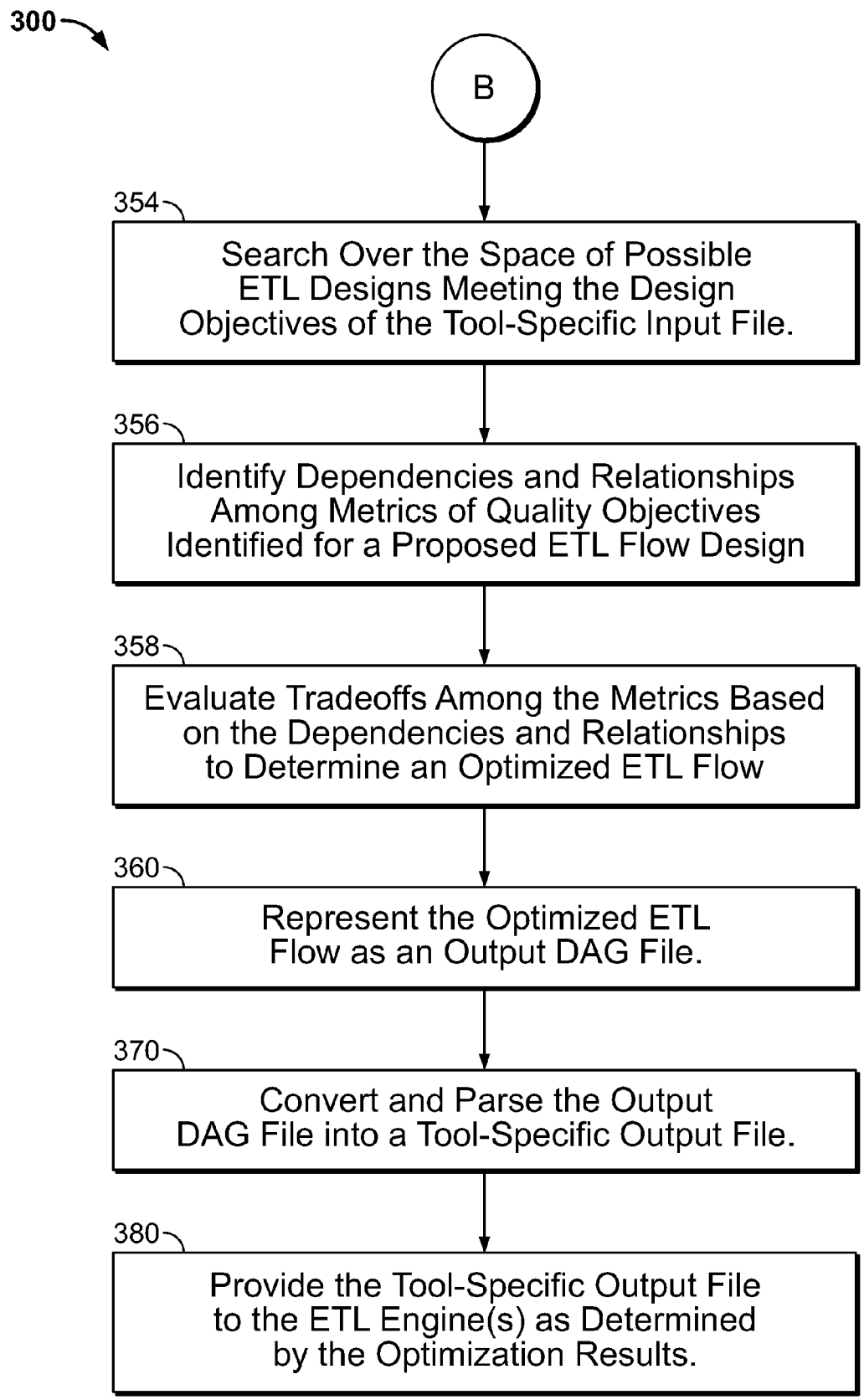

FIGS. 4A-4B schematically depict process 300 for optimizing an information integration flow in accordance with an embodiment of the invention. A tool-specific input file representing a logical ETL design of a physical flow may be received, step 310. As was mentioned above, the physical flow represented by the tool-specific input file may be an existing flow, or a proposed flow to be optimized.

The tool-specific input file data may be parsed, step 320, and semantics of the information integration flow may be identified to produce a tool-agnostic input file. These semantics may be enriched by properties accessible via a library. The parsed results of the tool-agnostic input file may be transformed, step 330, into a tool-agnostic input DAG having similar, or the same, semantics.

The input DAG may be provided, step 340, to a QoX-driven optimizer. The QoX-driven optimizer may apply, step 350, heuristic algorithms to the input DAG. The heuristic algorithms may be driven by the internal functional characteristics and properties of the information integration flow design represented by the tool-specific input file.

The heuristic algorithms may search, step 354, over the space of possible information integration flow designs meeting the design objectives of the tool-specific input file. The heuristic search may be guided by forecasting the metrics of quality objectives identified for a proposed information integration flow design and selecting an optimized information integration flow design based on evaluating the metrics.

The QoX-driven optimizer may identify, step 356, dependencies and relationships among the metrics. Tradeoffs among the metrics may be evaluated, step 358, based on the dependencies and relationships to determine an optimized information integration flow design. The optimized information integration flow may be performed on one or more of ETL tools 80 as determined by QoX-driven optimizer unit 106 to achieve multiple optimization goals in a distributed manner.

The optimized information integration flow design may be represented, step 360, as an output DAG. The output DAG may be converted and parsed, step 370, into a tool-agnostic output file and then a tool-specific output file that may be provided, step 380, to the ETL tool(s) as designated in the optimum information integration flow design developed by the QoX-driven optimizer.

In accordance with an embodiment of the invention, a computer program application stored in non-volatile memory, or computer-readable medium (e.g., hard drive, flash memory, CD ROM, magnetic media, etc.) may include code or executable instructions that when executed may instruct or cause a controller or processor to perform methods discussed herein such as a method of optimizing an information integration flow.

While there have been shown and described fundamental novel features of the invention as applied to several embodiments, it will be understood that various omissions, substitutions, and changes in the form, detail, and operation of the illustrated embodiments may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. An automatic information integration flow optimizer apparatus comprising:
an input/output port configured to connect the information integration flow optimizer to extract-transform-load (ETL) tools, and to receive a tool-specific input file; and
a processor configured to execute computer-readable instructions, the computer-readable instructions comprising:
a parser unit configured to parse the tool-specific input file into semantics, and to create a tool-agnostic input file containing rich semantics of at least one of datasets, implementations, schema, operators, database management systems, or ETL tools;
a converter unit configured to transform the tool-agnostic input file into an input directed acyclic graph (DAG); and
a quality objective (QoX) driven optimizer unit configured to apply one or more heuristic algorithms to the tool-agnostic input DAG to develop an optimum information integration flow design based on the rich semantics.

2. The apparatus of claim 1, wherein the QoX-driven optimizer unit is configured to provide an output DAG representing the optimum information integration flow design.

3. The apparatus of claim 2, wherein the converter unit and parser unit are configured to transform the output DAG to a tool-specific output file.

4. The apparatus of claim 1, wherein the optimum information integration flow design is optimized for multiple goals.

5. The apparatus of claim 1, wherein the QoX-driven optimizer unit is configured to designate portions of the optimum information integration flow design to be respectively performed in one or more of the ETL tools.

6. The apparatus of claim 1, wherein the QoX-driven optimizer unit is configured to examine functionality properties of an information integration flow operator provided by the tool-agnostic input file.

7. The apparatus of claim 1, wherein the QoX-driven optimizer unit is configured to choose among one or more specific execution instances related to a dataset to be processed by the physical information integration flow.

8. The apparatus of claim 1, wherein the QoX-driven optimizer unit is configured to partition a dataset to be processed by the physical information integration flow based on schema properties.

9. The apparatus of claim 1, wherein the QoX-driven optimizer unit is configured to optimize the physical information integration flow based on implementation properties presented in the tool-agnostic input file.

10. A method for automatically optimizing an information integration flow, the method comprising the steps of:
receiving a tool-specific input file representing a physical information integration flow;
parsing the tool-specific input file to identify semantics of the physical information integration flow;
creating a tool-agnostic input file containing rich semantics of at least one of datasets, implementations, schema, operators, database management systems, or ETL tools;
transforming the tool-agnostic input file into an input directed acyclic graph (DAG);
providing the input DAG to a quality objective (QoX) driven optimizer unit; and
applying one or more heuristic algorithms to the input DAG to develop an optimum information integration flow design based on the rich semantics.

11. The method of claim 10, further including the steps of:
searching possible information integration design space guided by forecasting metrics of quality objectives identified for a proposed information integration flow design; and
selecting the optimized information integration flow design based on evaluating the metrics.

12. The method of claim 11, further including the steps of:
identifying dependencies and relationships among the metrics; and
evaluating tradeoffs among the metrics based on the dependencies and relationships to determine the optimized information integration flow design, wherein the optimized information integration flow design is optimized for multiple goals.

13. The method of claim 10, further including the step of representing the optimized information integration flow design as an output DAG.

14. The method of claim 13, further including the steps of:
converting and parsing the output DAG into a tool-specific output file; and
providing portions of the tool-specific output file to ETL tools as designated in the optimum information integration flow design.

15. The method of claim 10, further including the step of examining functionality properties of a information integration operator provided by the tool-agnostic input file.

16. The method of claim 10, further including the step of choosing among one or more specific execution instances related to a dataset to be processed by the physical information integration flow.

17. The method of claim 10, further including the step of partitioning a dataset to be processed by the physical information integration flow based on schema properties.

18. The method of claim 10, further including the step of optimizing the physical information integration flow based on implementation properties presented in the tool-agnostic input file.

19. A non-transitory, tangible computer readable medium comprising:
an executable computer program code configured to instruct a system to automatically optimize an information integration flow, the executable computer program code comprising the steps of:
receiving a tool-specific input file representing a physical information integration flow;
parsing the tool-specific input file to identify semantics of the physical information integration flow;
creating a tool-agnostic input file containing rich semantics of at least one of datasets, implementations, schema, operators, database management systems, or ETL tools;
transforming the tool-agnostic input file into an input directed acyclic graph (DAG);

providing the input DAG to a quality objective (QoX) driven optimizer unit; and applying one or more heuristic algorithms to the input DAG to develop an optimum information integration flow design based on the rich semantics.

20. The non-transitory, tangible computer readable medium of claim 19, wherein the executable computer program code further comprises the steps of:

choosing among one or more specific execution instances related to a dataset to be processed by the physical information integration flow;

partitioning a dataset to be processed by the physical information integration flow based on schema properties; and optimizing the physical information integration flow based on implementation properties presented in the tool-agnostic input file.

* * * * *